US005149577A

United States Patent [19]

Chang et al.

[11] Patent Number: 5,149,577

[45] Date of Patent: Sep. 22, 1992

[54] DUAL PURPOSE STENCIL-FORMING SHEET CONTAINING A RED PIGMENT

[75] Inventors: Wei-Min Chang, Carmel, Ind.; Bror Anderson, Yonkers, N.Y.

[73] Assignee: Mallace Industries Corporation, Evanston, Ill.

[21] Appl. No.: 638,099

[22] Filed: Jan. 7, 1991

[51] Int. Cl.[5] ........................ B32B 3/00; B32B 21/06; B32B 27/00; B05C 17/06

[52] U.S. Cl. ........................ 428/207; 101/50; 101/127; 101/128.1; 428/195; 428/211; 428/245; 428/289; 428/290; 428/532; 428/535

[58] Field of Search ........................ 101/127, 128.1, 50; 428/211, 195, 207

[56] References Cited

U.S. PATENT DOCUMENTS

| | | | |
|---|---|---|---|
| 1,548,315 | 8/1925 | Herold | 428/311.3 |
| 1,588,022 | 6/1926 | Grange et al. | 101/128.21 |
| 1,655,249 | 1/1928 | Smith | 428/535 |
| 1,902,539 | 3/1933 | Brauer | 428/311.3 |
| 2,693,426 | 11/1954 | Hoover | 428/311.3 |
| 2,714,749 | 8/1955 | Clark et al. | 425/83.1 |
| 2,788,294 | 4/1956 | Clark et al. | 427/391 |
| 3,067,673 | 12/1962 | Anderson | 428/341 |
| 3,435,758 | 4/1969 | Brennan et al. | 427/143 |
| 3,694,244 | 12/1972 | Larson et al. | 264/526 |
| 3,694,245 | 9/1971 | Anderson et al. | 428/913 |
| 4,065,595 | 12/1977 | Schick et al. | 430/271 |
| 4,074,003 | 2/1978 | Schick et al. | 428/137 |
| 4,177,728 | 12/1979 | Koreska | 430/308 |
| 4,180,621 | 12/1979 | Maynard et al. | 428/535 |
| 4,209,565 | 6/1980 | Davis et al. | 428/347 |
| 4,351,685 | 9/1982 | Clark | 428/43 |
| 4,434,198 | 2/1984 | Clark | 428/311.3 |
| 4,477,557 | 10/1984 | Rauch | 430/308 |
| 4,766,033 | 8/1988 | Yoshimura et al. | 428/332 |

*Primary Examiner*—George F. Lesmes
*Assistant Examiner*—James D. Withers
*Attorney, Agent, or Firm*—Dressler, Goldsmith, Shore, Sutker & Milnamow

[57] ABSTRACT

A dual purpose stencil-forming sheet is provided comprising an ink-pervious fibrous tissue base having an ink-impervious impregnant therethrough, which impregnant is relatively non-bleeding and contains a red pigment. In a composite where the stencil-forming sheet is in contact with a white or pastel underlying backing sheet, the striking of a key or pin onto the stencil-forming sheet through a black inked ribbon simultaneously cuts the stencil, leaves a black marking on the cut stencil and leaves a red marking on the white or pastel backing sheet.

13 Claims, No Drawings

DUAL PURPOSE STENCIL-FORMING SHEET CONTAINING A RED PIGMENT

TECHNICAL FIELD OF THE INVENTION

This invention pertains to stencil-forming sheets, their preparation, and their utilization.

BACKGROUND OF THE INVENTION

As is well known, stencils are widely used in the application of markings to shipping containers. In many cases, it is desired to apply the same markings to shipping documents and it is economical to create the stencil and the marked shipping documents through the same marking operation, generally by the striking of typewriter keys.

Stencil-forming sheets are generally made by impregnating a porous, ink-pervious, fibrous tissue base sheet with an ink-impervious material so that the sheet becomes ink-impervious except in the localized areas where the sheet is struck by a typewriter or printer key or by printer pins.

Typically, the stencil impregnant has a pastel color, against which a typed or printed message, such as a shipping address, can be read easily if it is typed or printed in black ink, as by an inked ribbon between such keys or pins and the surface of the stencil-forming sheet.

When it is desired, to simultaneously type or print the same message onto an underlying sheet, such as a top sheet of a tabbed set of business forms, it has been necessary to have a separate "carbon" coating on the underside of the stencil sheet, the side opposite that which is struck by the keys or pins.

A separate "carbon" coating requires a separate coating operation with a coating composition different from the composition of the ink-impervious impregnant and thus adds both material and handling costs to the cost of the stencil-forming sheet.

SUMMARY OF THE INVENTION

In accordance with the present invention, there is provided a dual purpose stencil-forming sheet comprising a porous, ink-pervious, fibrous tissue base sheet and having an ink-impervious impregnant therethrough, said impregnant comprising a red pigment, a film-forming material, and an organic solvent-soluble resin having a softening point in excess of 160° C., said impregnant being the sole impregnant in or on said base sheet. Preferably, the film-forming material comprises nitrocellulose or cellulose acetate butyrate.

The red pigment in the impregnant imparts a red color thereto and to the stencil-forming sheet against which black letters or markings, as applied from an inked ribbon where struck by keys or pins, are readily visible. The red pigment is also readily visible on any underlying backing sheet which is white or pastel when imprinted on the backing sheet by the striking of the same keys or pins.

The organic solvent-soluble resin is selected to be one of high softening point to reduce "bleeding" into an underlying backing sheet when a composite stencil-forming sheet and backing sheet is maintained in storage.

To prepare the dual purpose stencil-forming sheet of this invention, a liquid impregnating composition containing a film-forming material, a red pigment, a high softening point resin and a suitable organic solvent is first applied to either one side or both sides of a porous ink-pervious tissue base sheet. Application to one side may be by brush or roller. Application to both sides may be by continuous passage of an endless web of the base sheet material through a bath of the impregnating composition. Whether the application is to one side or both sides the impregnating composition penetrates through the entire thickness of the base sheet material by reason of its porosity.

After impregnation, excess impregnating liquid is drained off, or wiped off, and then the impregnated base sheet material is dried. At least a portion of the organic solvent in the impregnating composition is evaporated until the point where the sheet material feels dry to the touch. When the organic solvent contains a relatively high boiling constituent, such as benzyl alcohol, a portion thereof may remain behind in the resin, as a plasticizer, even after evaporation.

The porous, ink-pervious, fibrous tissue base sheet used in this invention is similar to the base sheet material conventionally used in the manufacture of stencil-forming sheets. Typically, it may be formed of any suitable fiber, such as abaca, kozo, sisal, flax, viscose rayon, polyester, or mixtures thereof, loosely arranged in a non-woven manner to provide a foraminous, highly permeable tissue. Typically, the tissue, before impregnation, may weigh from about 4½ to about 12 pounds per 3000 square feet.

The amount of liquid impregnating composition applied to the porous, ink-pervious, fibrous tissue base sheet is not critical because excess liquid either drains off, or is wiped off, and at least a portion of the solvent therein is thereafter evaporated off. The amount of impregnant remaining in the porous, ink-pervious tissue base sheet after evaporation is typically from about 270% to about 320% of the dry weight of the unimpregnated tissue base sheet.

The dual purpose stencil-forming sheet of this invention may be assembled with one or more backing sheets to form a composite article suitable for the simultaneous formation, or cutting, of a stencil and the imprinting of one or more removable shipping documents. For this purpose, the stencil-forming sheet and the backing sheet(s) are generally rectangular in form and are attached to each other at at least one edge of the stencil. The backing sheet, or the top backing sheet if there is more than one, is either white or pastel in color so that red pigment deposited thereon by key or pin strikings from the stencil-forming-sheet will be readily visible.

One aspect of this invention utilizes the above described composite article and specifically provides a method for simultaneously applying legible markings to a stencil-forming sheet to thereby create a stencil and on a backing sheet which comprises providing a composite of a stencil-forming sheet and a white or pastel backing sheet, said sheets being attached to each other at at least one edge of the stencil, said stencil-forming sheet comprising an ink-impervious, relatively non-bleeding red impregnant throughout the thickness thereof, said impregnant being in direct contact with said backing sheet, and applying markings by applying dark pigment under pressure, from an inked ribbon, at localized locations onto said stencil-forming sheet on the side thereof opposite the side in contact with said backing sheet while creating marking apertures in said stencil-forming sheet at said localized locations to make a stencil and while applying red pigment at said localized locations by said pressure onto said backing sheet from said impregnant to create legible markings thereon.

DESCRIPTION OF THE PREFERRED EMBODIMENTS

The impregnant in the stencil-forming sheet of this invention must, as any impregnant in a stencil-forming sheet, be ink-impervious, except where struck by a typewriter or printer key, by printer pins, or by handwriting with a ball-point pen or stylus. It must also be red in color on both sides of the stencil-forming sheet, preferably having a maximum reflectance between about 6220 and about 7700 Angstrom units.

Finally, it must also be relatively nonbleeding, which means that it has little if any effect on any underlying backing sheet when a composite of stencil-forming sheet and backing sheet is maintained in storage.

The impregnant composition, as stated above, contains a film-forming material, a red pigment, a high softening point resin and a suitable organic solvent.

The organic solvent is one which dissolves the nitrocellulose and the high softening point resin. Mixed organic solvents may be used, particularly solvents containing ethanol, as a major component. In such a mixed solvent, a relatively high boiling solvent such as benzyl alcohol may be present so that a portion remains behind as a plasticizer after drying.

A typical mixed solvent composition may contain:

| | |
|---|---|
| Ethyl acetate | 5-15% |
| Ethanol | 60-90% |
| Isopropanol | 0-5% |
| Benzyl Alcohol | 5-15% |

The solute and suspended components of the impregnant composition include, as stated above, a film-forming material, a high softening point resin, and a red pigment. In addition, oils and surfactants may also be included in the impregnant composition.

The solute and suspended components of the impregnant composition may, for example, comprise:

| | |
|---|---|
| Nitrocellulose | 5-15% |
| Surfactant(s) | 20/35% |
| Oil(s) | 20-30% |
| High Softening point resin | 5-15% |
| Pigment(s) | 10-30% |

The nitrocellulose component may be a mixture of two or more different viscosities, such as a mixture of ¼ second nitrocellulose with 5-6 second nitrocellulose. Cellulose acetate butyrate may be alternatively used.

The surfactants are preferably nonionic surfactants. Sorbitan oleate (Span 85) and sorbitan trioleate (Span 80) are suitable.

The oils may be either vegetable or mineral oils.

A suitable high softening point resin is an alcohol- and alkali-soluble resin, sold under the trademark PENTREX 255, which is a pentaerythritol ester of rosin acids having a softening point between about 165° and 175° C., an acid number between about 180 and about 200 and a maximum Gardner Color of 11. It is soluble in ethanol, isopropanol, diethylene glycol, triethylene glycol, propylene glycol, dipropylene glycol and aqueous alkalis. It is insoluble in ethylene glycol and water.

EXAMPLE

An impregnant solvent is prepared containing by weight:

| | |
|---|---|
| Ethyl acetate | 12% |
| Ethanol | 76% |
| Isopropanol | 2% |
| Benzyl alcohol | 10% |

To this solvent are added (a total of 47 parts per 100 parts of solvent) of:

| | |
|---|---|
| 5-6 second nitrocellulose | 6.27% |
| ¼ second nitrocellulose | 2.66% |
| Span 85 | 23.88% |
| Span 80 | 3.76% |
| Castor oil | 14.88% |
| Mineral oil | 18.85% |
| Pentex 255 resin | 8.86% |
| DBPC (dibutyl para-cresol) | 1.00% |
| Red 2 B pigment (as 70% suspension in Span 85) | 9.92% |
| $TiO_2$ white pigment (as 60% suspension in castor oil) | 9.92% |

The combined composition is applied to one surface of a porous base sheet (Dexter —6.5 lbs. per 3000 square feet) by roller; and excess impregnant is metered off using a wire-wound rod. This sheet is then dried in an oven at 118 C. until it is dry to the touch.

The thus prepared stencil-forming sheet may be cut into suitable rectangular sheets and assembled with one or more backing sheets, depending on the number of shipping documents desired.

The invention has been described with respect to its preferred embodiments. It will be understood by those skilled in the art that modifications may be employed without departing from the scope of the invention as defined in the claims herein.

We claim:

1. A dual purpose stencil-forming sheet consisting essentially of a porous, ink-pervious, fibrous tissue, base sheet and an ink-impervious, red impregnant therethrough, said impregnant comprising a red pigment, a film-forming material, and an organic solvent-soluble resin having a softening point in excess of 160° C., the red pigment imparting a red color to said stencil-forming sheet and constituting means for enabling said stencil-forming sheet to receive readily visible black-on-red markings from a black-inked ribbon and to apply readily visible red-on-white or red-on-pastel markings by applying some of the red pigment to a backing sheet which is white or pastel in color, and which is in direct contact with said impregnant, as the ribbon is struck by keys or pins.

2. The dual purpose stencil-forming sheet of claim 1 wherein said red pigment has its maximum reflectance between about 6220 and about 7700 Angstrom units.

3. The dual purpose stencil-forming sheet of claim 1 wherein said resin is alcohol soluble.

4. The dual purpose stencil-forming sheet of claim 3 wherein said resin is an alkali-soluble resin having a softening point not lower than about 160° C. and an acid number not lower than about 175.

5. The dual purpose stencil-forming sheet of claim 4 wherein said resin has a softening point between about 165° and about 175° C. and an acid number between about 180 and 200.

6. The dual purpose stencil-forming sheet of claim 1 wherein said impregnant comprises nitrocellulose.

7. The dual purpose stencil-forming sheet of claim 1 wherein said impregnant comprises benzyl alcohol, part of which performs as a volatile solvent while the residue acts as a plasticizer.

8. A composite article suitable for the simultaneous formation of a stencil and the imprinting at least one shipping document comprising an essentially rectangular stencil-forming sheet and an essentially rectangular backing sheet, said stencil-forming sheet and said backing sheet being attached to each other at least one edge of said stencil-forming sheet, said stencil forming sheet comprising an ink-impervious, fibrous tissue, base sheet having an ink-impervious, red impregnant therethrough, said impregnant being in direct contact with said backing sheet, said backing sheet being white or pastel in color, said impregnant comprising a red pigment imparting a red color to said stencil-forming sheet and constituting means for enabling said stencil-forming sheet to receive visible black-on-red markings from a black-inked ribbon and to apply visible red-on-white or red-on-pastel markings to said backing sheet as the ribbon is struck by keys or pins.

9. The composite article of claim 6 wherein said impregnant contains an alcohol soluble resin.

10. The composite article of claim 9 wherein said resin is an alkali-soluble resin having a softening point not lower than about 160° C. and an acid number not lower than about 175.

11. The composite article of claim 10 wherein said resin has a softening point between about 165° and 175° C. and an acid number between about 180 and 200.

12. The composite article of claim 8 wherein said impregnant comprises nitrocellulose.

13. The composite article of claim 8 wherein said impregnant comprises benzyl alcohol, as a solvent and plasticizer.

* * * * *